United States Patent [19]

Macchiarulo et al.

[11] Patent Number: 5,021,032
[45] Date of Patent: Jun. 4, 1991

[54] TENSIONING DEVICE FOR FLEXIBLE DRIVING BELTS

[75] Inventors: Vincenzo Macchiarulo, Pescara; Edoardo Robecchi, Milan; Alberto Ruffini, Chieti, all of Italy

[73] Assignee: Pirelli Trasmissioni Industriali S.p.A., Milan, Italy

[21] Appl. No.: 493,427

[22] Filed: Mar. 14, 1990

[30] Foreign Application Priority Data

Mar. 15, 1989 [IT] Italy .................. 19788 A/89

[51] Int. Cl.[5] .............................................. F16H 7/12
[52] U.S. Cl. ................................... 474/138; 474/117; 474/118; 474/135
[58] Field of Search ............... 474/101, 103, 104, 109, 474/110, 115, 117, 118, 133, 135–138

[56] References Cited

U.S. PATENT DOCUMENTS

| | | | |
|---|---|---|---|
| 3,538,789 | 11/1970 | Quick et al. | 474/109 X |
| 4,241,614 | 12/1980 | Gould | 74/15.63 |
| 4,411,638 | 10/1983 | Wilson | 474/138 |
| 4,466,803 | 8/1984 | Wilson | 474/138 |
| 4,473,362 | 9/1984 | Thomey et al. | 474/135 |
| 4,708,696 | 11/1987 | Kimura et al. | 474/103 |
| 4,743,225 | 5/1988 | Okabe | 474/133 |
| 4,752,280 | 6/1988 | Brandenstein et al. | 474/138 |

FOREIGN PATENT DOCUMENTS

A0243237  10/1987  European Pat. Off. .
A2181814   4/1987  United Kingdom .

Primary Examiner—Bruce M. Kisliuk
Attorney, Agent, or Firm—Stevens, Davis, Miller & Mosher

[57] ABSTRACT

A tensioning device is provided for a flexible belt wound around the pulleys of a drive mechanism. The tensioning device includes an elastic biasing element and a damping mechanism. The biasing element applies a force on the belt in a predetermined direction to oppose belt slackenings. The damping mechanism dampens movements of the belt. The biasing element and the damping mechanism constitute a single unit wherein both exert on the belt forces which act on the belt at the same time in a predetermined direction to maintain a predetermined tensioning. The biasing element acts independently of the damping mechanism in the presence of considerable slackenings of the belt and functions as part of the damping mechanism to dampen thrusts of the belt acting on the device in the direction opposite to the predetermined direction. A connection unit connects the damping mechanism to the biasing element. This connection unit is an elastic system which applies a reaction force according to the predetermined direction in which the biasing element acts on the belt.

20 Claims, 3 Drawing Sheets

TENSIONING DEVICE FOR FLEXIBLE DRIVING BELTS

FIELD OF THE INVENTION

The present invention is directed to a tensioning device for flexible driving belts, and, more particularly, the invention is directed to a tensioner intended to be associated with a flexible belt wound around the pulleys of a drive mechanism to originate an annular configuration with a predetermined tensioning in order to ensure the correct working of the drive mechanism.

BACKGROUND OF THE INVENTION

As is heretofore known in many applications, a driving belt is wound around a plurality of pulleys one of which is a driving pulley and the other ones of which are driven pulleys adapted to move various accessory devices. For example, a toothed belt can be inserted in the drive of a motor vehicle to transmit the motion from the driving shaft to the camshaft. Also, for example, a belt, in particular a V-belt, can be used in a motor vehicle to transmit the motion from the crankshaft to a plurality of pulleys which in turn are associated with various devices, among which are the engine cooling fan, the engine water pump, the alternator, or the compressor of the air conditioning system if present.

In general, the above type of belt, when used in many of the above-noted applications to connect various pulleys for driving the plural devices arranged in different positions, is oriented in an annular zig-zag configuration requiring the use of a suitable device known as a tensioner to exert on the loose branch of the belt a predetermined tensioning that guarantees the regular working of the drive.

Moreover, as known from U.S. Pat. No. 4,706,696, a tensioner can be formed mainly of a hydraulic cylinder inside which is disposed a piston immersed in a viscous liquid that, in turn, is associated with a stem projecting from the upper base of the cylinder. The piston part opposite to the stem is provided with a cylindrical spring applied between the lower base of the cylinder and the inner face of the piston. The piston is crossed by a hole, which in the rest position is closed by a ball thrust against the hole due to the action of an auxiliary opposite spring maintained in an appropriate seat on the lower surface of the piston. In this device the free end of the stem acts on an appropriate lever anchored at one end to a structure fixed with respect to the belt and having its free end associated with a roller which presses with a given force against the back of the belt. If belt slackenings occur due to instantaneous torque changes on the driving pulley or any other cause, the pressure exerted on the lower part of the piston by the spring suitable for tensioning the belt is no longer compensated by the pressure that the belt exerts in an opposite direction on the stem, so that the piston has a tendency to move upwardly causing the liquid to pass through the hole provided on the piston overcoming the stiffness of the counteracting spring which blocks the exit of the hole through the cited ball. In this tensioning device, the dimensions of the hole crossing the piston are conveniently chosen in order to reduce the resistance met by the liquid on passing through the hole itself and to facilitate the shifting of the stem upwardly so that the roller presses again on the back of the belt to restore correct tensioning of the latter.

In the event of increases in the belt tension caused, for instance, by a thermal expansion phenomena tending to move apart the supports of the two pulleys between which the belt branch thrust by the tensioner is arranged, the belt exerts on the stem a force in a direction opposite to that previously described in the loose condition. In this situation the tensioning device is adapted to damp the movements of the belt through a blow-by of liquid between the upper chamber and the lower chamber of the piston; the blow-by of liquid is obtained by means of a very narrow hydraulic passage between the piston and the cylinder wall. In practice, the thrust that the belt transmits to the stem enables the pressure of the liquid present in the lower chamber to maintain the ball against the hole crossing the piston, thus blocking this hole and forcing the liquid to pass from the lower chamber to the upper one through the very reduced space between the piston and the cylinder. In essence, a liquid rolling occurs to which a damping of the movement transmitted by the belt to the tensioner corresponds.

U.S. Pat. Nos. 4,411,638 and 4,466,803 disclose additional examples of tensioning devices. All these devices provide also a tensioning spring to shift the piston together with the stem for restoring correct tensioning of the belt and a recourse to a proper choice of two valves and of suitable hydraulic circuits connected to the valves. In substance, such devices operate such that the upward thrust of the piston is facilitated, while the thrust of the piston in opposite direction is slower. The upward thrust of the piston is facilitated because when one of the valves opens, this allows the passage of the viscous liquid from the upper chamber to the lower one, for instance, through a large-sectioned conduit, while to obtain damping of the belt movements, the second valve makes the liquid pass from the lower chamber to the upper one through a conduit having a section much narrower than that of the first conduit, or through a conduit provided with a narrowing so as to increase the resistance met by the liquid on passing between the two chambers.

Unfortunately, in all of these devices the spring intended to restore the belt tensioning is strictly connected to the viscous means and this retards the restoration of the desired tensioning. In fact, the valve and the relative circuit chosen with a suitable determination of the size to facilitate the step of maximum excursions of the stem determines a certain forcing of the liquid through the passage section between the two chambers and this in turn determines a slowing down in the action of the tensioning spring. This solution can result in a completely unacceptable drive and produces numerous risks for the integrity of the system to which the drive is connected. In fact, in the case of a toothed belt applied between the driving shaft and the camshaft, in the event of belt slackenings not immediately compensated by the action of the spring of the tensioner, a skipping phenomenon could occur in relation to one or more teeth of the belt from the teeth of the pulley by which the belt meshes, with the consequence of originating a displacement in the adjusting system of the valves set in action by the camshaft and in some circumstances irreparable damage to the motor vehicle engine.

Moreover, in all the applications in which recourse is made to a device for the transmission of motion between a belt and a pulley through the exchange of friction forces, a retardation in the intervention of the tensioning spring in the event of slackenings of the belt produces unavoidably a sliding phenomena between the belt and the surfaces of the pulleys, with the consequence of damaging the elastomeric material for the dissipation of energy due to the strong friction forces created.

Additionally, all of the heretofore known solutions are complex due to the use of valves and relative circuits that permit an asymmetric working of the tensioning device.

SUMMARY OF THE INVENTION

Therefore, the object of the present invention is to provide a tensioning device for a flexible driving belt devoid of all the above-noted drawbacks in the prior art.

An object of the present invention is to provide a tensioning device intended to be associated with a flexible belt wound around the pulleys of a drive mechanism to originate an annular configuration with a predetermined tensioning. The tensioner comprises a biasing elastic element and a damping group or mechanism. The biasing element is suitable for applying on the belt a force according to a predetermined direction to oppose slackenings of the belt. The damping group is suitable for damping movements of the belt. The tensioning device is characterized in that the biasing element and the damping group constitute a single unit, with the biasing element and the damping group exerting on the belt forces acting at the same time in the aforesaid predetermined direction for maintaining a predetermined tensioning and with the biasing element acting independently of the damping group in the event of belt slackenings and functioning as part of the damping group for the thrusts of the belt acting on the tensioning device in a direction opposite to the aforesaid predetermined direction. A connection means is provided for connecting the damping group to the biasing element. The connection means comprises an elastic system, applying a reaction force to the belt in the aforesaid predetermined direction.

BRIEF DESCRIPTION OF THE DRAWINGS

The above and other objects, advantages and features of the invention will be more fully understood when considered in conjunction with the following discussion and the attached drawings, of which.

DETAILED DESCRIPTION OF THE PREFERRED EMBODIMENTS

Figure 1:
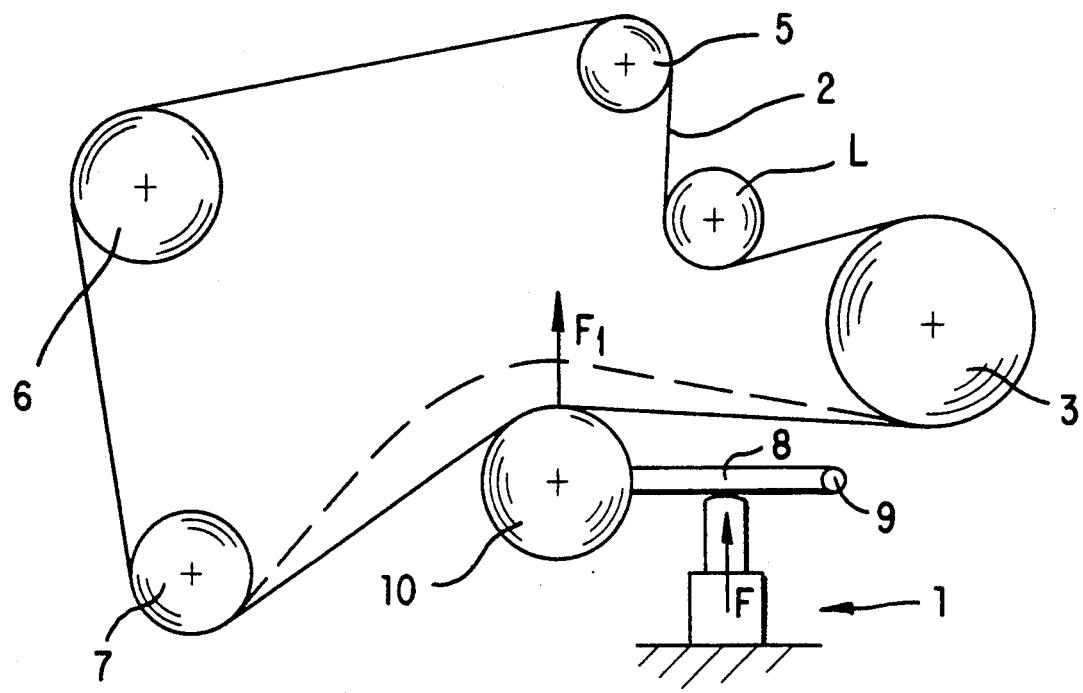
FIG. 1 is a schematic view illustrating a flexible belt wound around the pulleys of a drive according to an annular configuration and a tensioning device according to the invention acting on a branch of the belt.

In FIG. 1 reference numeral 1 refers to a tensioning device intended to be associated with a flexible belt 2 formed of elastomeric material or the like, wound around the pulleys of a drive mechanism to originate an annular configuration having a predetermined tensioning for a correct working of the drive. In FIG. 1, pulley 3 is a driving pulley and pulleys 4, 5, 6 are driven pulleys suitable for transmitting movement to a plurality of accessories, for example, in a motor vehicle. Tensioner 1 comprises preferably an elastic biasing element and a damping group or mechanism, the former exerting a force in the predetermined direction F to which a force applied on the belt back corresponds, the latter acting to damp the movement of the belt in a direction opposite to the predetermined direction F. Tensioner 1 acts on a lever 8 hinged at one end 9 to a frame fixed with respect to belt 2 and having its opposite end associated with a rotating roller 10 acting under pressure on the back of belt 2 according to the direction $F_1$. The biasing element and the damping group exert on belt 2 forces acting at the same time in the direction F to maintain the cited predetermined tensioning.

Moreover, an essential characteristic of the present invention resides in that the biasing element acts independently of the damping group in the presence of belt slackenings which are represented with dashed line in FIG. 1 and forms part of the group or mechanism for damping the thrusts acting on the device in the direction opposite to F.

A further characteristic of the invention provides moreover means for connecting the damping group to the biasing element. The connecting means comprise an elastic system whose reaction acts in the cited predetermined direction F.

Also a further characteristic of the invention is that the previously cited parts, i.e. the biasing element, the damping group and the connecting means, constitute part of a single unit having one end secured to a fixed support such as the motor vehicle frame and the opposite end acting at an intermediate point of the lever 8.

Figure 2:
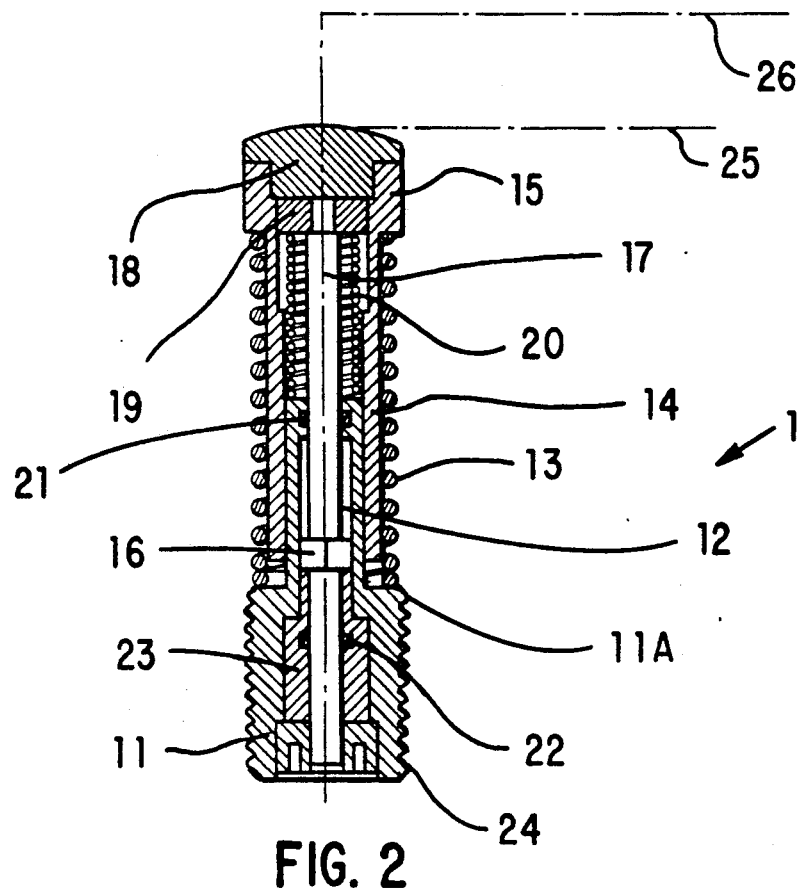
FIG. 2 is a sectioned view of the tensioning device of FIG. 1.

In the preferred embodiment of FIG. 2, the tensioning device 1 comprises a cylindrical envelope 11; inside cylindrical envelope 11 there is a damping group 12, for instance of hydraulic type, while outside, concentrically to the envelope, there is a biasing element in the form of a cylindrical metallic spring 13. Metallic spring 13 is disposed around a sleeve 14 provided with a flange 15 supporting one end of spring 13. Sleeve 14 already provided with the spring is slidingly mounted on the outer walls of envelope 11, and flange 15 is arranged toward the upper part of the tensioning device. Moreover, spring 13 leans against a step 11A of envelope 11. Damping group 12 in turn comprises a damping liquid contained inside envelope 11, a piston 16 immersed in the liquid, and a stem 17 associated at one end with piston 16 and projecting from the upper base of envelope 11 with its other end, with a very narrow space being provided between piston 16 and the inner walls of envelope 11 to enable a blow-by of liquid from one part to the other of piston 16 which is subject to move.

Piston 16 defines in envelope 11 two chambers herein termed an upper chamber and a lower chamber. As shown in FIG. 2 the upper end of sleeve 14 is closed by a lid 18 abutting against flange 15 and on the free end of stem 17 is mounted a head 19 abutting against the lower surface of lid 18 in conditions of maximum compression of the tensioning device as shown in FIG. 2.

According to a preferred embodiment of the invention, the means for connecting damping group 12 and biasing element 13 comprises a further second spring 20 arranged inside sleeve 14 between the upper base of envelope 11 and head 19 at the end of stem 17. The tensioning device comprises also a sealing strip 21 disposed between stem 17 and the upper base of envelope 11 and a sealing strip 22 positioned between stem 17 and a core-like element 23 forming the lower part of envelope 11.

Tensioning device 1 comprises securing means with a suitable frame fixed with respect to the belt. Preferably the securing means can be formed by a screw thread 24 around envelope 11 and a corresponding surface threaded on the frame to which the tensioner is secured.

Figure 5:
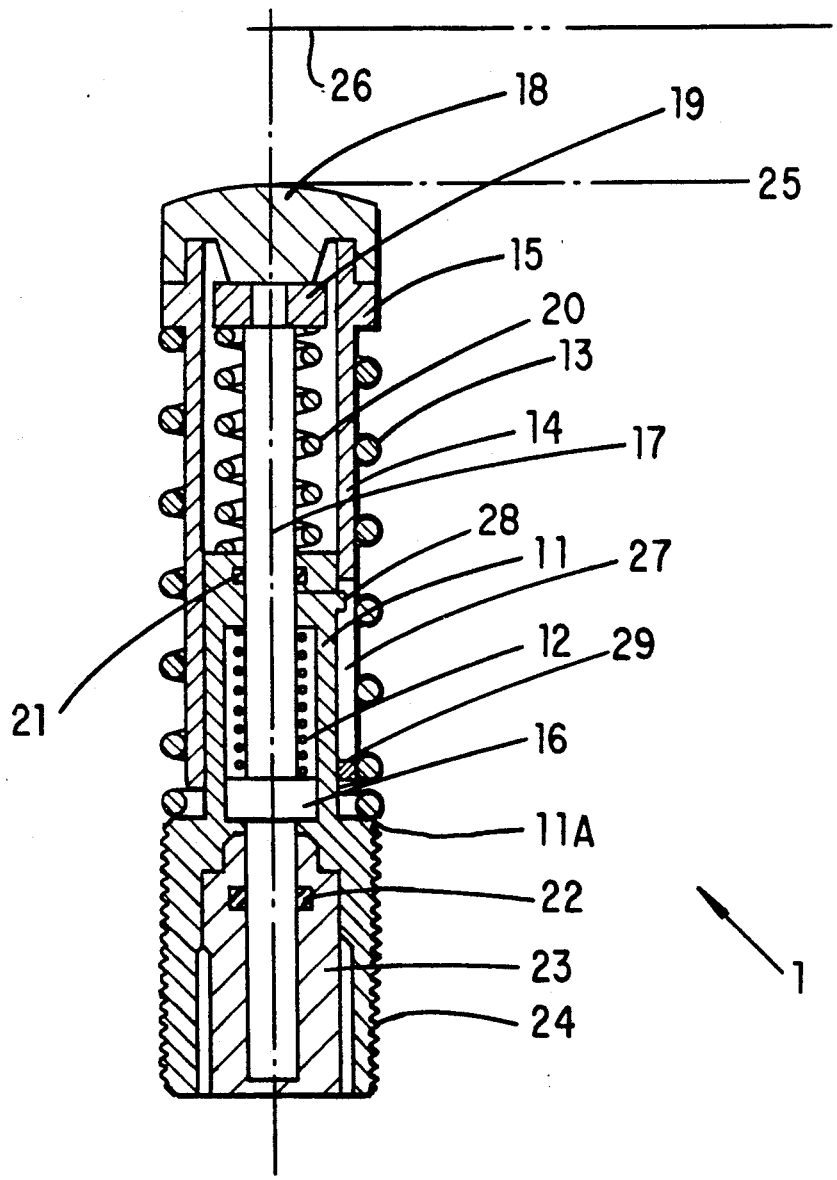
FIG. 5 shows additional details of the FIG. 1 embodiment.

FIG. 5 shows additional details of the embodiment of FIG. 1, directed to means for blocking the maximum shifting of sleeve 14 corresponding to the condition of maximum excursion of spring 13 between lines 25 and 26. The blocking means are constituted by a narrow longitudinal opening of slot 27 located on the interior surface of sleeve 14, by a pin 28 projecting from the upper base of envelope 11 into slot 27, and by a protuberance 29 projecting perpendicularly relative to sleeve 14 within slot 27; in the condition of maximum excursion of spring 13 protuberance 29 abuts against pin 28.

According to an alternative embodiment of the invention, the spring of the connecting means for interconnecting damping group 12 to biasing element 13 can be arranged in a different way than that shown in FIG. 2 and in particular said spring can be inserted inside envelope 11 between the lower surface of piston 16 and the lower base of envelope 11.

Figure 4:
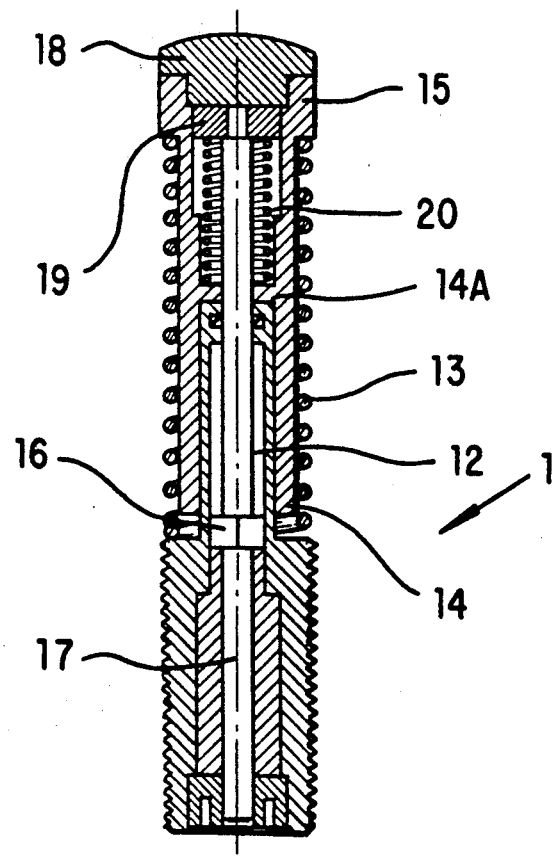
FIG. 4 shows schematically an alternative embodiment of the tensions device according to the invention.

According to a further embodiment shown in FIG. 4, the spring functioning to connect damping group 12 to biasing element 13 can be arranged inside sleeve 14 around stem 17 between head 19 at the free end of stem 17 and the flange 14A of sleeve 14. This embodiment permits a precompression of spring 20 when spring 13 extends upwardly.

According to a further embodiment, also based on that of FIG. 4, spring 13 operates between the supporting surface to which the envelope base is secured and lid 18 and also in this embodiment spring 20 is mounted between head 19 of stem 17 and the base of a case associated with lid 18.

The tensioning device shown in FIGS. 2 and 4 can be applied to flexible belts of different types. In particular, the tensioning device can be applied to toothed belts of elastomeric material or the like, such as polyurethane.

Figure 3:
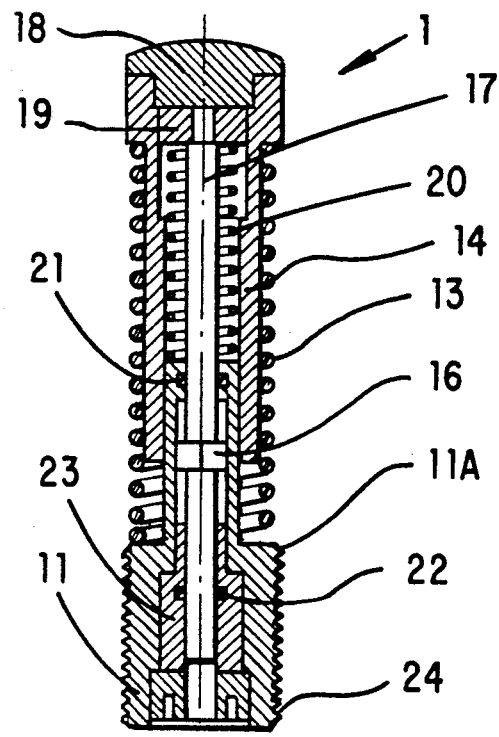
FIG. 3 is a sectioned view of an operative condition of the of FIG. 2.

In the embodiment of FIGS. 2 and 3 it has been found advantageous to arrange a biasing element whose elastic reaction strength, opposing the elongations of the belt, has a magnitude between 20% and 70% of the total load given by the sum of springs 13 and 20 of the tensioning device necessary for maintaining the starting predetermined tension.

A tensioning device of the invention can be applied to flexible belts of elastomeric material or the like comprising surfaces adapted for transmission of forces by friction with surfaces of one or more pulleys. In this embodiment it has been found advantageous to provide the tensioning device with biasing elements whose reaction strength opposing the slackening of the belt has a magnitude between 40% and 80% of the total load given by the sum of springs 13 and 20 of the tensioner to maintain the starting predetermined tensioning of the belt.

Operation of the tensioning device shown schematically in the operative condition of FIG. 3 when associated with the flexible belt of FIG. 1 is as follows.

If an increase occurs in the annular length of the belt, according to the configuration shown with a dashed line in FIG. 1, caused e.g. by a strong variation of the motive torque acting on pulley 3, in a transient sense, the branch of the belt located between pulley 3 and 7 does not transmit thrusts to roller 10. Consequently, spring 13 of the biasing element, since it has been released, according to the principle of the present invention, of any dependence from damping group 12, immediately pushes lid 18 upwardly in the direction of arrow F advancing through roller 10 the back of belt 2 into a new tensioning position determined by the extension characteristics of spring 13. In turn, damping group 12 is not receiving on the free end of stem 17 a downward thrust exerted by lid 18 which, since it is moved away upwardly, tends to transmit through spring 20 an upward thrust to piston 16. Unlike that of spring 13, the movement of piston 16 is not instantaneous, since it is subject to a viscous effect. In fact, the movement of piston 16 upwardly can take place as the pressure of spring 20 overcomes the pressure of the viscous liquid in the upper chamber of envelope 11, causing the blowby of the liquid between the very narrow space between the wall or piston 16 and the inner walls of envelope 11. It is noted that the means for connecting damping group 12 to the biasing element joins gradually damping group 12 to the biasing element in the new balance position; in this new position, head 19 of stem 17 is in contact with the lower surface of lid 18.

If in the new tensioning condition or in the starting tensioning condition the belt suffers an increase of tension, for example, when thermal expansions acting on the supports of pulleys 3 and 7 tend to move the two pulleys farther apart from each other increasing the tension transmitted by the belt to roller 10, roller 10 is subject to a thrust that the belt exerts from the inside toward the outside. The effect of this thrust tends to cause gradual shifting of piston 16 downwardly with a graduality determined by the resistance met by the damping liquid on passing from the lower chamber to the upper chamber through the narrow space between tho outer walls of piston 16 and the inner walls of cylinder 11. The forcing of the liquid in the cited narrow space determines a damping to the movement of belt 2 caused by the increase of tension on the belt.

The working of the tensioning device according to the alternative embodiment illustrated and described in FIG. 4 is substantially the same as that already described with regard to FIGS. 2 and 3. A working difference can be found in the embodiment of FIG. 4 due to the presence of flange 14A of sleeve 14 In fact, in the transient condition determined by a slackening of the belt, piston 16 has an initial tendency to remain still with head 19 of stem 17, while flange 14A is in movement with sleeve 14. In this condition, the movement of sleeve 14 makes spring 20 unstable up to such a value as to originate a storage of energy which is then returned accelerating the connection between damping group 12 and spring 13 in the new operative position. In the transient condition, the thrust on belt 2 applied by the device is the difference between the action of spring 13 and the reaction of spring 20. Only when head 19 of stem 17 returns into contact with lid 18 is the opposite action of spring 20 annulled with only spring 13 acting on the belt.

In the embodiment of FIG. 4 it has been found advantageous that during the transient condition the thrust on the belt, represented by the difference between the two springs 13 and 20, is between 20% and 70% of the total load of the tensioning device in the drives provided with toothed belts and is between 40% and 80% of the total load of the tensioner for V-belts, flat belts and grooved belts.

The invention achieves all the above-stated purposes. In fact, in the belt slackening condition, represented with a dashed line in FIG. 1, due to the presence of biasing element 13, a new immediate tensioning of the belt is obtained avoiding all of the drawbacks found in the heretofore known tensioning devices. This optimal result depends on the fact that biasing element 13 is not connected mechanically to stem 17 whose movements are strictly connected with viscous effects and, i.e., with phenomena linked to a time factor in a measure which is in contrast with an immediate intervention. Therefore, when instantaneous slackenings of the belt occur, biasing element 13 can intervene immediately, avoiding the risks of the skipping phenomenon of a toothed belt in contact with the belt of a pulley or a sliding of a V-belt on the groove of a pulley as in the previously known devices. Moreover, the characteristic of the invention relating to the presence of connection means 20 for connecting damping group 12 to biasing element 13 permits advantageous restoration of the connection between the two active parts of the tensioning device. Therefore, in the new position assumed by roller 10 on the back of belt 2, the tensioning device is adjusted again automatically so that it can exert at the same time a thrust in direction F determined by the forces of reaction of springs 13 and 20, and at the same time the tensioner is arranged in the condition of being able to damp the return movements of the belt characterized by the thrusts acting in a direction opposite to direction F.

It should be noted that the above description and the accompanying drawings are merely illustrative of the application of the principles of the present invention and are not limiting. Numerous other arrangements which embody the principles of the invention and which fall within its spirit and scope may be readily devised by those skilled in the art. For example, the damping group can comprise liquid blow-by means different from that described above, i.e. among other things, one or more holes passing through the thickness of the piston. In this embodiment the transverse dimensions of the holes are comparable with the narrow space located between the piston and the envelope as in the above-described embodiments. In practice preferred values for the holes are between 0.01 and 0.08 mm. Moreover, the damping group of hydraulic type can comprise a system provided with valves arranged so as to adjust according to a desired measure the degree of the blow-by of liquid from the upper chamber to the lower chamber and conversely from the lower to the upper. Also this embodiment allows the immediate intervention of the biasing element in the event of belt slackenings; this is achieved because said element according to the principle of the invention would act in the direction F of FIG. 1 independently of the damping group, without suffering in any way the retarding phenomena originated by the valves. According to further embodiments of the invention, it is also possible to associate the biasing element with a damping group based on a principle different from that described above, i.e. a damping device comprising, for instance, an elastomeric block which dissipates energy by friction sliding on the walls of a cylinder so as to damp the movement transmitted by the belt to the elastomeric piston through the suitable stem. Moreover, in further embodiments it is possible to arrange a plurality of springs adapted to constitute the biasing element and the connecting means.

We claim:

1. A tensioning device for a flexible belt wound around a plurality of pulleys of a drive mechanism in an endless configuration, said tensioning device supplying to the belt a load to produce in said belt a predetermined tensioning, said device comprising:
    (a) a cylindrical envelope having a base adapted to be secured to a fixed support;
    (b) a sleeve slidably and coaxially mounted on the cylindrical envelope and having a flange at one end thereof;
    (c) a lid mounted on the flange of the sleeve;
    (d) a biasing means interposed between the base of the cylindrical envelope and said flange to apply on the belt a force oriented in a predetermined direction to oppose slackenings of the belt;
    (e) a damping mechanism partially disposed inside an interior space defined in the cylindrical envelope and having a stem slidably guided through a throughbore disposed in an upper base of said cylindrical envelope opposite with respect to the fixed support, and including a head provided for acting against said lid; and
    (f) an elastic means acting on the head of the stem to urge said head against said lid, said elastic means cooperating with the biasing means to apply to the belt forces acting in said predetermined direction to maintain said predetermined tensioning, the biasing means acting independently of the damping mechanism in response to instantaneous elongations of the belt.

2. A device as in claim 1, wherein said biasing means comprises a spring having one end adapted to apply a spring force to the belt and an opposite end associated with a support fixed with respect to the belt, said force of said spring having a value between 20% and 80% of said load supplied by the tensioner to originate said predetermined tensioning of the belt.

3. A device as in claim 1, wherein said cylindrical envelope is arranged inside an interior space of the spring to provide a guiding surface for movement of the spring.

4. A device as in claim 1, wherein said end of said sleeve is closed by a lid abutting against said flange and wherein a free end of said stem is in contact with the lid.

5. A device as in claim 1, wherein the elastic means interconnects the damping mechanism to said spring of said biasing means and comprises an elastic system disposed in an interior space defined by said sleeve and between said base of the cylindrical envelope having said stem projecting therethrough and a head mounted on the projecting end of said stem.

6. A device as in claim 1, further comprising an envelope provided with a damping liquid in an interior space thereof, a piston movably disposed within said interior space and immersed in said liquid, a stem associated with said piston and disposed partially within said interior space and projecting outwardly from said envelope, a space being provided between said piston and interior walls of the envelope to enable blow-by of said liquid from opposite ends of said piston within said interior space.

7. A device as in claim 1, wherein said belt is a toothed belt.

8. A device as in claim 7, wherein said biasing means provides a reaction opposing slackenings of the belt having a value between 20% and 70% of the total load of the tensioning device to maintain said predetermined tension.

9. A device as in claim 1, wherein said belt has a surface for transmission of forces by friction with corresponding surfaces of the pulley.

10. A device as in claim 9, wherein said biasing means provides a reaction opposing slackenings of the belt having a value between 40% and 80% of the total load of the tensioner to maintain said predetermined tension.

11. A device as in claim 1, wherein said cylindrical sleeve and said cylindrical envelope form a single unit with said biasing means and said damping mechanism, said biasing means being disposed outside said cylindrical envelope and comprising a metallic spring disposed around said sleeve, said sleeve being slidably disposed around the outer walls of the cylindrical envelope, said flange being located on an end of said sleeve near the end of said stem projecting outwardly from said cylindrical envelope.

12. A device as in claim 1, wherein said elastic means acts between said head of the stem and a flange provided inside the sleeve.

13. A tensioning device for a flexible belt wound around a plurality of pulleys of a drive mechanism in an endless configuration, said tensioning device supplying to the belt a load to provide to said belt a predetermined tensioning, said device comprising:
   (a) an elastic biasing means;
   (b) a damping mechanism, said biasing means applying on the belt a force oriented in a predetermined direction to oppose slackenings of the belt, said damping mechanism comprising damping means for damping movements of the belt, said biasing means and said damping means cooperating to apply to the belt forces acting simultaneously in said predetermined direction so as to maintain said predetermined tensioning, said biasing means acting independently of the damping means in response to instantaneous elongations of the belt and cooperating with said damping means to damp belt movements in a direction opposite to said predetermined direction;
   (c) elastic means interconnecting the damping mechanism and the biasing means, said elastic means undergoing elastic reaction forces in response to forces applied thereto in said predetermined direction; and
   (d) a cylindrical sleeve and a cylindrical envelope which forms a single unit with said biasing means and said damping mechanism, said damping mechanism being partially disposed within an interior space defined by said cylindrical envelope and said biasing means being disposed outside said cylindrical envelope, said damping means comprising a stem partially disposed within said cylindrical envelope and projecting outwardly from a throughbore in one base of said cylindrical envelope and the biasing means comprising a metallic spring disposed around said sleeve, said sleeve being provided with a flange supporting one end of the spring, said sleeve being slidably disposed around the outer walls of the cylindrical envelope, said flange being located on an end of said sleeve near the end of said stem projecting outwardly from said cylindrical envelope.

14. A device according to claim 13, wherein said spring has another end which abuts against an annular seat of said cylindrical envelope.

15. A tensioning device for a flexible belt wound around a plurality of pulleys of a drive mechanism in an endless configuration, said tensioning device supplying to the belt a load to provide to said belt a predetermined tensioning, said device comprising:
   (a) an elastic biasing means;
   (b) a damping mechanism, said biasing means applying on the belt a force oriented in a predetermined direction to oppose slackenings of the belt, said damping mechanism comprising damping means for damping movements of the belt, said biasing means and said damping means cooperating to apply to the belt forces acting simultaneously in said predetermined direction so as to maintain said predetermined tensioning, said biasing means acting independently of the damping means in response to instantaneous elongations of the belt and cooperating with said damping means to damp belt movements in a direction opposite to said predetermined direction;
   (c) elastic means interconnecting the damping mechanism and the biasing means, said elastic means undergoing elastic reaction forces in response to forces applied thereto in said predetermined direction; and
   (d) a cylindrical envelope defining an interior space in which said damping mechanism is partially disposed, said biasing means being disposed outside said cylindrical envelope, said damping mechanism comprising a stem disposed partially within said interior space of said cylindrical envelope and projecting from one base of the cylindrical envelope and said biasing means comprising a first cylindrical spring mounted around the cylindrical envelope and having one end secured to a supporting surface integral with another base of the cylindrical envelope and another end fixed relative to a lid means for acting on the belt, said elastic means comprising a second cylindrical spring arranged between a flange positioned at one end of said stem projecting outwardly from said cylindrical envelope and a base of a case which moves in association with said lid means, wherein in a transient condition responsive to slackenings of the belt, the total force applied to the belt by said tensioning device is represented by the difference between the action of said first and second springs.

16. A tensioning device for a flexible belt wound around a plurality of pulleys of a drive mechanism in an endless configuration, said tensioning device supplying to the belt a load to provide to said belt a predetermined tensioning, said device comprising:
   (a) an elastic biasing means;
   (b) a damping mechanism, said biasing means applying on the belt a force oriented in a predetermined direction to oppose slackenings of the belt, said damping mechanism comprising damping means for damping movements of the belt, said biasing means and said damping means cooperating to apply to the belt forces acting simultaneously in said predetermined direction so as to maintain said predetermined tensioning, said biasing means acting independently of the damping means in response to instantaneous elongations of the belt and cooperating with said damping means to damp belt movements in a direction opposite to said predetermined direction; and
   (c) elastic means interconnecting the damping mechanism and the biasing means, said elastic means undergoing elastic reaction forces in response to forces applied thereto in said predetermined direction; and wherein said damping mechanism comprises means for enabling blow-by of liquids.

17. A tensioning device for a flexible belt wound around a plurality of pulleys of a drive mechanism in an endless configuration, said tensioning device supplying to the belt a load to provide to said belt a predetermined tensioning, said device comprising:

(a) an elastic biasing means;
(b) a damping mechanism, said biasing means applying on the belt a force oriented in a predetermined direction to oppose slackenings of the belt, said damping mechanism comprising damping means for damping movements of the belt, said biasing means and said damping means cooperating to apply to the belt forces acting simultaneously in said predetermined direction so as to maintain said predetermined tensioning, said biasing means acting independently of the damping means in response to instantaneous elongations of the belt and cooperating with said damping means to damp belt movements in a direction opposite to said predetermined direction;
(c) elastic means interconnecting the damping mechanism and the biasing means, said elastic means undergoing elastic reaction forces in response to forces applied thereto in said predetermined direction; and
(d) a cylindrical envelope defining an interior space in which said damping mechanism is partially disposed, said biasing means being disposed outside said cylindrical envelope, said damping mechanism comprising a stem disposed partially within said interior space of said cylindrical envelope and projecting from one base of the cylindrical envelope and said biasing means comprising a first cylindrical spring mounted around the cylindrical envelope and having one end secured to a supporting surface integral with another base of the cylindrical envelope and another end fixed relative to a lid means for acting on the belt, said elastic means comprising a second cylindrical spring arranged between a flange positioned at one end of said stem projecting outwardly from said cylindrical envelope and a base of a case which moves in association with said lid means, wherein in a transient condition responsive to slackenings of the belt, the total force applied to the belt by said tensioning device is represented by the difference between the action of said first and second springs, and wherein said belt is a toothed belt.

18. A device as in claim 17, wherein in a transient condition the thrust of the device on the belt is between 20% and 70% of the total load of the tensioner to maintain said predetermined tension.

19. A tensioning device for a flexible belt wound around a plurality of pulleys of a drive mechanism in an endless configuration, said tensioning device supplying to the belt a load to provide to said belt a predetermined tensioning, said device comprising:

(a) an elastic biasing means;
(b) a damping mechanism, said biasing means applying on the belt a force oriented in a predetermined direction to oppose slackenings of the belt, said damping mechanism comprising damping means for damping movements of the belt, said biasing means and said damping means cooperating to apply to the belt forces acting simultaneously in said predetermined direction so as to maintain said predetermined tensioning, said biasing means acting independently of the damping means in response to instantaneous elongations of the belt and cooperating with said damping means to damp belt movements in a direction opposite to said predetermined direction;
(c) elastic means interconnecting the damping mechanism and the biasing means, said elastic means undergoing elastic reaction forces in response to forces applied thereto in said predetermined direction; and
(d) a cylindrical envelope defining an interior space in which said damping mechanism is partially disposed, said biasing means being disposed outside said cylindrical envelope, said damping mechanism comprising a stem disposed partially within said interior space of said cylindrical envelope and projecting from one base of the cylindrical envelope and said biasing means comprising a first cylindrical spring mounted around the cylindrical envelope and having one end secured to a supporting surface integral with another base of the cylindrical envelope and another end fixed relative to a lid means for acting on the belt, said elastic means comprising a second cylindrical spring arranged between a flange positioned at one end of said stem projecting outwardly from said cylindrical envelope and a base of a case which moves in association with said lid means, wherein in a transient condition responsive to slackenings of the belt, the total force applied to the belt by said tensioning device is represented by the difference between the action of said first and second springs, and wherein said belt has surfaces for transmitting forces by friction with corresponding surfaces of the pulleys.

20. A device as in claim 19, wherein in a transient condition the thrust of the device on the belt is between 40% and 80% of the total load of the tensioner to maintain said predetermined tension.

* * * * *